United States Patent
Ritchie et al.

(10) Patent No.: US 11,436,135 B2
(45) Date of Patent: Sep. 6, 2022

(54) POLYMORPHIC ALLOCATORS IN AN OPERATING SYSTEM

(71) Applicant: Arista Networks, Inc., Santa Clara, CA (US)

(72) Inventors: Duncan Stuart Ritchie, Bowen Island (CA); Christopher Elisha Neilson, Vancouver (CA); Sebastian Sapa, Vancouver (CA)

(73) Assignee: Arista Networks, Inc., Santa Clara, CA (US)

( * ) Notice: Subject to any disclaimer, the term of this patent is extended or adjusted under 35 U.S.C. 154(b) by 140 days.

(21) Appl. No.: 17/066,208

(22) Filed: Oct. 8, 2020

(65) Prior Publication Data

US 2022/0114084 A1 Apr. 14, 2022

(51) Int. Cl.
*G06F 12/00* (2006.01)
*G06F 12/02* (2006.01)
*G06F 12/0802* (2016.01)

(52) U.S. Cl.
CPC ........ *G06F 12/023* (2013.01); *G06F 12/0802* (2013.01)

(58) Field of Classification Search
CPC .... G06F 12/02; G06F 12/023; G06F 12/0802; G06F 12/1009
See application file for complete search history.

(56) References Cited

U.S. PATENT DOCUMENTS

| 2017/0147408 | A1* | 5/2017 | Nishikawa | G06F 16/00 |
| 2018/0018095 | A1* | 1/2018 | Lee | G06F 3/0685 |
| 2018/0107506 | A1* | 4/2018 | Suzuki | G06F 9/4806 |
| 2020/0104196 | A1 | 4/2020 | Ritchie et al. | |

* cited by examiner

*Primary Examiner* — Shawn X Gu

(74) *Attorney, Agent, or Firm* — Fountainhead Law Group P.C.

(57) ABSTRACT

Systems and methods for implementing polymorphic allocators in an operating system are disclosed. An illustrative method includes a method of allocating memory space in a memory by creating a first allocator. In response to receiving a first request to allocate memory space in the memory for a data buffer instance using the first allocator, the method allocates one or more pages of a first region in the memory by populating one or more entries of an allocator table. The one or more entries of the allocator table correspond to the one or more pages of the first region. The entries of the allocator table are indexed by page indexes corresponding to page addresses identifying the pages of the first region in the memory. Each of the populated entries of the allocator table includes a specific allocator identifier identifying a corresponding allocator to that entry.

20 Claims, 12 Drawing Sheets

POLYMORPHIC ALLOCATORS IN AN OPERATING SYSTEM

BACKGROUND

The present disclosure relates generally to memory allocation systems and particularly to memory allocation systems using polymorphic memory allocators.

BRIEF DESCRIPTION OF THE DRAWINGS

The various objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
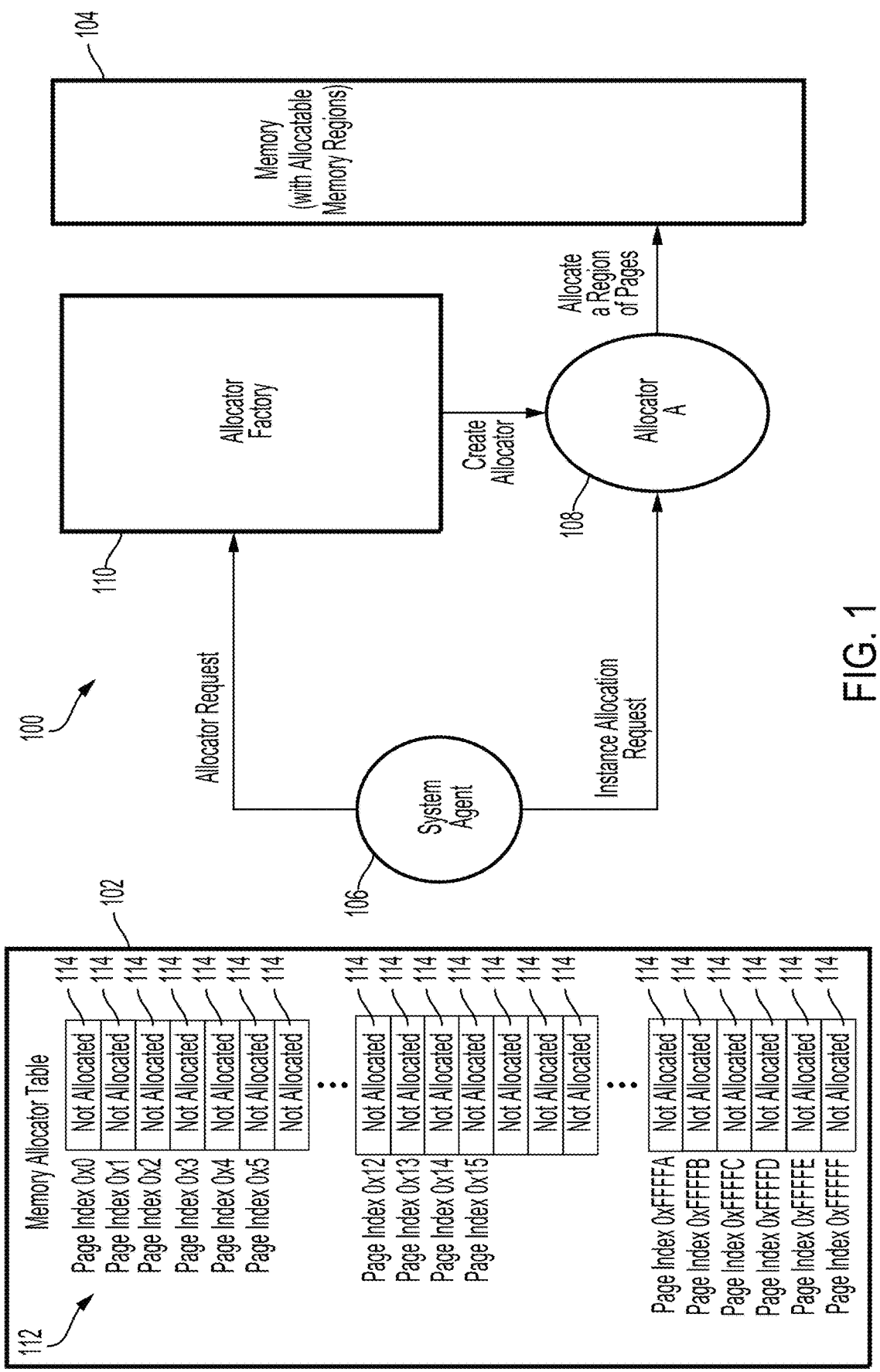
FIG. 1 shows a block diagram of a polymorphic allocator system, in accordance with some embodiments of the disclosure.

Programmable memory, or storage, not lacking in variety, is a ubiquitous commodity in nearly every electronic application. Rapid developments in online support infrastructures—the network under the hood—have brought on challenging memory utilization demands. The marriage of high-level programming languages and memory allocators is a clear example, while one makes feature set enhancements and advancements, the other attempts to accommodate the enhancements and advancements. Memory allocators are commonly employed by software codes of, for example, networking applications, and often in varying types.

One of the latest features of the high-level programming language C++ is a polymorphic allocator, a memory allocation system promising to enhance program design flexibility by supporting allocator varietal types. The polymorphic allocator can give credence to a more robust software design enabling programmers to vary runtime allocation behavior despite an identical static allocator type. Further, the custom allocator design is reusable and compatible with standard template library (STL) containers given the benefit of a standardized interface, a feature byproduct. But like most new feature sets, the recently introduced memory allocator management system comes at a cost, namely, an overhead cost—memory overhead is added with every object instance. What is more, polymorphic allocators of the popular networking design high-level programming language, C++, can be limited in utility. That is, because the allocator designs are templated on data types, they are precluded from programming languages (other than C++) lacking template support.

Pre-polymorphic allocators, programmers of the world of C++ commonly employed the default heap allocator but not without certain challenges. While reasonably universal, the heap allocator is deficient in serving all data memory allocation goals equally. Effective in general purpose, the heap allocator can allocate arbitrary data types on the heap, but in specialized circumstances, it falls short of serving the role of a special purpose allocator, one that is highly effective at allocating a certain type of data. For example, when employed in a system requiring allocation of millions of 32-byte data entries, each belonging to a particular type of data, the heap allocator places the heap under undue pressure with potential resulting fragmentation outcomes in the presence of the millions of entries. Fragmentation generally stems from the large number of entries, i.e., 32-byte, interspersed with many software-created alternate-sized entries.

Accordingly, existing polymorphic allocators are not only memory consuming, therefore costly, they can be design and utility limiting. In some designs, an object is stored with an associated allocator reference, such as a pointer, for ease of an associated allocator identification, new instance allocation in a common allocator, and accurate allocator identification during instance deletion and deallocation. Storing an allocator reference with each instance of 32-byte entry objects for millions of object instances is hardly practical and requires mounds of extra overhead space. For larger size instances, the associated overhead comes with an even higher cost. In a 32-bit environment, a single object allocator reference, for example, may be four bytes in size, and in a 64-byte environment, a single object allocator reference may be eight bytes in size, a size increase of up to four bytes for each instance of data. With millions of entries, eight-byte allocator references require megabytes worth of extra memory space—an infeasible solution.

Various disclosed embodiments include polymorphic allocator systems encompassing allocators to allocate memory in a memory type nondiscriminatory manner. Objects may be allocated on a data heap, in bulk memory, or in shared memory, for example. The customized allocator may be specifically tailored to allocate a particular data type therefore accomplishing the task with particular expertise and efficiency. For example, the allocator may be designed to allocate 32-byte data entries highly efficiently while avoiding interfering with other object allocations even when coexisting with the system data heap.

In various embodiments of the disclosure, an allocator is created. In response to receiving a request to allocate memory space for a data buffer instance in memory, the allocator allocates a region of one or more pages in the memory. The process of allocating includes populating one or more entries of an allocator table. The entries of the allocator table are indexed by page indexes corresponding to page addresses identifying pages in memory, and the populated entries of the allocator table each include an allocator identifier identifying an associated allocator.

In some embodiments, the allocator has a customized memory allocator design, specialized for efficient allocation of certain data allocator types. The specialized allocator reserves memory space for storing data buffer instances in bulk or other types of memory. A data buffer instance may be an object instance, for example, a reference-counted object, or a data instance. To save memory space, a data buffer instance is stored in memory without a reference to the allocator responsible for creating the instance. Accordingly, the process of deleting a data buffer instance from memory requires identification of the allocator responsible for the creation of the data buffer instance. In some embodiments, the data buffer instance is self-destructing. For example, a reference-counted object may self-destruct when its associated reference count is determined to reach zero or a predefined value. The identity of the allocator responsible for creating the instance is revealed by processing the page address of a page or the data buffer instance address of a data buffer instance, in memory, with assistance from the allocator table. The allocator table may include one or more entries, each entry identifying a corresponding allocator with an allocator identifier.

The allocator generates the data buffer instance pointer at the time the allocator stores the instance in memory. Each entry of the allocator table is indexed by a page index derived from a page address of a page in memory in which the data buffer instance resides. In some embodiments, at least a portion of the memory may be organized into regions with each region including one or more pages holding one or more data buffer instances. An allocator may decide to release a region of memory space upon determining the region lacks any data buffer instances. In some embodiments, a region may be released, or deallocated, while one or more data buffer instances remain in the region.

In some embodiments, the allocator table may hold entries for more than one allocator. Each of multiple allocators of a common or a different type may reserve a distinct region in memory for storing pages of data buffer instances. Like a region, a page of memory is uniquely addressable by a single allocator.

In accordance with a disclosed method for managing allocation management of a shared memory system, memory page addresses correspond to page indexes of an allocator table based on memory size and page size granularity. The memory pages are identifiable based on page addresses corresponding to page indexes of the allocator table. As pages are committed to a created region of memory, the corresponding page indexes indicate which allocator table entries to update. Conversely, when a region is deleted, the corresponding pages indexes indicate which allocator table entries to delete.

The relationship between a page index and a corresponding page address is based on modification of the latter to derive the former. In some embodiments, the modification is truncation of the page address to generate a corresponding page index. For example, based on the page size granularity, several lower bits of the page address may be truncated (e.g., the page address is shifted to the right by several lower page address bits) to generate the corresponding page index, indexing entries in the allocator table.

In various embodiments, software code is used to allocate memory from different allocators to give alternate behavior to different allocators and improve system performance. For proper implementation, to delete an instance from memory, the allocator responsible for creating the instance is identified. Indeed, an object is provided with the capability to self-destruct following a similar protocol. In some embodiments, the allocator table may be an array of contiguous table entries, a lock-free table access feature and multiple allocators may access the table simultaneously.

As earlier noted, the allocator table entries are indexed by page indexes originating from memory page addresses. For example, a region in bulk memory may have a first page at page address 0 holding one or more data buffer instances, and a second page of the region in bulk memory may be at page address 0x1000 holding additional instances, and a third page may be at page address 0x2000 holding yet other instances. By virtue of truncating the lower 12 bits of a page address (shifting the page address bits to the right by 12 bits), the correct entry in the allocator table may be (page) indexed, the table entry immediately revealing the identity of the allocator used to create a corresponding instance in memory. When an instance is to be deleted, the location of the instance in memory, for example at page 0x2000, is truncated by the lowest 12 bits to generate the page index 2 into the allocator table. The table entry indexed by page index 2 identifies the allocator responsible for the creation of the instance and the allocator deletes the instance and deallocates or releases the memory space (e.g., buffer) holding the instance. By accessing the allocator table, allocators know to allocate new regions or deallocate old regions—populate new entries or de-populate old entries. In some cases, the first entry of a portion of the allocator table assigned to a specific allocator identifies the address of a corresponding first page of a region in memory and subsequent entries of the allocator table assigned to the specific allocator identify addresses of corresponding subsequent pages of the region in memory.

FIG. 1 shows a block diagram of a polymorphic allocator system 100 implementing various disclosed memory allocation and deallocation techniques herein. In accordance with some embodiments, polymorphic allocator system 100 includes a memory allocator table 102, memory 104, and a system agent 106. In response to various requests from system agent 106 and/or program code instructions, such as instructions of a software (client) application, one or more memory allocators may be created or instantiated by an allocator factory 110 for allocating memory to store data buffer instances in memory 104. In response to various events, system agent 106 may initiate the process of creation or instantiation of one or more memory allocators, for example, allocator A 108 in FIG. 1. For example, system agent 106 may initiate the process of creation or instantiation of one or more memory allocators in response to a program code request for allocation of memory space or in response to an attempt by an operating system interacting with system 100 to allocate memory to meet a user program code or system condition or requirement. In some embodiments, system agent 106 may bypass the process of creating an allocator in a case where an existing allocator may be employed for storing the data buffer instances in memory 104.

In some embodiments, system 100 may be part of a computer system, such as without limitation, a networking system for implementing or interfacing with an operating system that carries out certain functions in response to executed program code, such as C++, to control, configure, or test the flow of network traffic. For example, system 100 may be part of or coupled to a networking system facilitating program code functionality implementation by a Linux operating system. In this respect, system 100 effectively implements an operating system overlaying or interacting with a commercially available operating system, such as the Linux operating system. System 100 need not be part of a networking system and can be incorporated in or coupled to any suitable computing system requiring memory allocation through one or more memory allocators, as directed by a client application.

Memory allocator table 102 may include one or more tables made of any suitable readable and writable storage space, for example and without limitation, random access memory (RAM), non-volatile memory, or a combination thereof. In embodiments where table 102 is made of multiple tables, one or more tables may be dedicated to a distinct memory allocator at any given time when memory space in memory 104 is allocated, or one or more data buffer instances are stored in memory 104. In embodiments where table 102 is made of a single table, a portion of the table may be dedicated to a distinct memory allocator at any given time when memory space in memory 104 is allocated, or one or more data buffer instances are stored in memory 104. The size of a table, the number of tables, and the size of the portion of a table assigned to an allocator may be based on the size of a region and the number of allocated pages in the region of memory 104. For clarity of illustration, in the example of FIG. 1 and figures to follow, the memory allocator table (e.g., table 102 in FIG. 1) is presumed to have a size of 0x1000000 (in hexadecimal notation). It is understood that a memory allocator table of various embodiments may have a different size.

In some embodiments, table 102 is configured as an array of entries, for example but not limited to, a contiguous array of table entries. In some embodiments, table 102 is configured as a hash table. In embodiments where table 102 is configured as entries organized into an array of rows, each row includes a table entry uniquely identifiable by a page index. In the example of FIG. 1, rows of table 102 are indexed by page indexes 112 and each page index identifies a distinct allocator identifier (table entry) 114. In embodiments implementing table 102 as a hash table, the hash table is indexed by page indexes that identify the entries, which in turn identify distinct allocator identifiers. In embodiments implementing table 102 as an array of entries, the system directly indexes into region 42 in table 102. In some cases, the hash table approach may save memory space by not requiring storage for empty entries, as required in the direct lookup table approach.

Page indexes 112 correspond to pages of regions of memory 104, further described below. Memory 104 may be organized, at least in part, into regions of one or more pages of buffers capable of allocation by a memory allocator of various disclosed embodiments. In some embodiments, memory 104 need not be organized into regions and one or more pages of memory 104 are capable of allocation by a memory allocator of various disclosed embodiments. Memory 104 may be bulk (heap) memory or may be made of various types of memories, such as shared memory and local memory. In some embodiments, memory 104 may be organized, in part or in whole, into a hierarchical structure, a flat structure, or a combination thereof, of object instances and entry instances. For example, memory 104 may be bulk memory including shared memory with one or more hierarchical collections of data buffer (object or data) instances. Some of the data buffer instances may include reference-counted objects and some may simply be data. Memory 104 may be made of, in part or in whole, suitable types of memory other than shared or local memory capable of being accessed by one or more polymorphic allocators, as disclosed herein. In some embodiments, table 102 may be incorporated, in part or in whole, in memory 104.

Entries forming the rows of table 102 may include corresponding allocator identifiers 114, which are initially empty or without any meaningful data. For example, immediately following a system 100 power-up or reset operation, table 102 may include null or predefined values representing the lack of allocation of any pages in memory 104. In some embodiments, table 102 may be initialized using a Linux operating system-specific feature commonly referred to as "anonymous mapping" that pretends to allow the existence of table 102 but does not actually allocate physical memory to table 102 until it is required. Accordingly, no initialization of table 102 is required because by default, all table entries are set to the value 0. The value 0 is automatically returned in response to an entry read operation without the existence of a physical table. This is particularly useful for a large, empty table, for example a table that is several megabytes in size but in fact, there is no memory or storage allocation for the large-size table.

Additionally, system 100 may not initially include an allocator, such as allocator A 108. For example, no allocator from allocator factory 110 may be instantiated until receipt of a first allocator request from system agent 106. Similarly, no memory space in memory 104 may be allocated immediately following a system power-up or a system reset operation and all memory spaces in memory 104 are free or available for allocation until a first request for storing or creating a data buffer instance is received. As readily known, a memory allocator, such as allocator A 108, generally manages memory spaces of memory 104 for storing data buffer instances in or deleting data buffer instances from memory 104.

In operation, system agent 106 may make a request to create or instantiate an allocator—an allocation request—from allocator factory 110. System agent 106 may make such a request in response to a program code execution, such as execution of an <alloc> command of a C++ program or in response to a request from a program to create or instantiate (store) a data buffer instance. System agent 106 may make a request to instantiate a data buffer instance in response to such a request from an application, for example. A request from system agent 106 to allocate an allocator may arise from a client application, such as, without limitation, a need to use or make use of a particular program feature that is better suited to a particular type of allocator. Allocators with different traits—polymorphic allocators—may be allocated to meet different purposes. For example, in the interest of achieving system performance optimization, particularly, in large scale systems, such as a networking system, a particular allocator type might be better at allocating smaller objects while a different allocator type might be better at allocating larger objects. Accordingly, various embodiments herein perform allocator customization, creating allocators that are particularly good at and highly optimized for allocation of certain object types, for example. In some embodiments, polymorphic allocators with self-optimization features of different criteria may be created. The criteria may be based, for example, on the manner in which a particular software application is desirous of performing memory allocation and a pattern of memory allocation by the software application. Use of polymorphic allocators in accordance with various embodiments herein calls for the data buffer instances (objects or entries) in memory to know which allocator created them because deletion of a data buffer instance from memory requires an allocator that created the data buffer instance to perform the data buffer instance deletion and corresponding memory space deallocation from memory. In various embodiments shown and discussed herein, object or entry instances do not carry any allocator identification information. Ignorance of their allocators requires the objects and entries to locate the identity of their respective allocators. In some cases, an instance allocator identification determination is based on address conversion for use in performing a table lookup operation leading to the correct instance allocator identification.

In some cases, the data buffer instance allocation request from system agent 106 may indicate a data buffer instance size. In the example of FIG. 1, allocator factory 110 creates allocator A 108 in response to the request from system agent 106 to create an allocator and the created allocator in turn uses the instance size to allocate memory space in memory 104 that is adequately based on the instance size for storing the instance. In some embodiments, a request to create or store a data buffer instance by system agent 106 triggers allocation of a region of pages in memory 104 by allocator A 108. Allocator A 108 may allocate a page of a region in memory 104 of a specific memory space size based on the memory space requirements of the instance to-be-stored. In some embodiments, the size of the memory space for allocation of an instance is predefined, not necessarily based on individual instance sizes. System agent 106 is generally memory 104 region-unaware whereas allocator A 108 is generally memory 104 region-aware.

Allocation of pages of a region in memory 104 includes allocation of one or more pages of the region with each page identifiable by a page address, as shown and discussed relative to subsequent figures. For example, memory 104 is organized into regions with each region includes one or more pages and each page includes one or more data buffer instances—objects or data—but not each page of memory 104 need include an instance and some pages of memory 104 may include more than one instance. The number of pages in a region may be determined by an allocator during allocation of the region or a matter of system design. In some embodiments, the number of pages may be limited by the size of the region and page size. A page size may be predefined (fixed) or varying. With reference to the example of FIG. 1, given a predefined page size of 4 Kilo Bytes (KB) (or 4096 bytes), a region with a size of 8 KB includes at least 2 pages. A region of memory 104 need not necessarily include a data buffer instance. For example, prior to creating the first data buffer instance of a region in memory 104, the region may be allocated in response to an allocator request but with no data buffer instance instantiation at least for a period of time. A region or a page of a region may be absent data buffer instances for various other reasons.

In response to receiving a request to allocate a data buffer instance in memory 104 from system agent 106, allocator A 108 allocates one or more pages of a region with a provided memory size as discussed above and stores the data buffer instance in an allocated page of the region. Allocator A 108 may determine which region of memory 104 and which page of the region of memory 104 to allocate and store the data buffer instance based on the availability of memory space in memory 104. In some embodiments, allocator A 108 manages memory allocation of memory 104 in accordance with methods and embodiments of U.S. Publication No. 2020/ 0104196, titled "System and Method of a Shared Memory Allocator", published on Apr. 2, 2020, filed on Jul. 19, 2019, by Ritchie et al., the disclosure of which is incorporated herein by reference as though set forth in full. When allocation of the region is complete or during the process of region allocation, allocator A 108 populates table 102 specifically at the page indexes 112 of table 102 that correspond to page addresses of the pages allocated for the region in memory 104 with table entries (allocator identifiers). That is, each allocated page of the region in memory 104 has a corresponding table entry in table 102 identifying allocator A 108 and each table entry is indexed by a page index corresponding to the page address of a corresponding allocated page in memory 104.

At a time after the data buffer instance is stored in memory 104, allocator A 108 may decide to delete the data buffer instance from memory 104 and release the buffer to make it available for use by other allocators for other regions. In some embodiments, the data buffer instance self-destructs. For example, the data buffer instance may be a reference-counted object and when the reference count of the object reaches a predefined value, such as 0, the data buffer instance may automatically self-destruct. The data buffer instance initiates its deletion by determining the identity of the allocator responsible for its creation, i.e. allocator A 108, because the instance carries no identifying information and is unaware of the allocator responsible for its creation. The data buffer instance may determine the identity of its allocator by resorting to table 102 to locate a corresponding allocator identifier (table entry). For example, the data buffer instance may be a state machine determining the identity of its allocator pursuant to various embodiments disclosed herein. The data buffer instance finds the correct allocator identifier in table 102 by using the page address of the page in which the data buffer instance resides in memory 104. A correspondence between the page address of the data buffer instance and a page index 112 of table 102 leads the data buffer instance to a table entry, indexed by the page index 112, identifying its allocator—allocator A. Alternatively, or additionally, the data buffer instance may determine the correct page index of table 102 by a correspondence between the address of the data buffer instance in memory 104 and the page index of table 102 instead of a correspondence between the page address of the page in which the instance resides and the page index of table 102.

In response to identification of the correct allocator identifier 114 in table 102, allocator A 108 takes over the instance deletion process and appropriately removes the data buffer instance from memory 104, releasing the corresponding data buffer from memory 104. Contrary to prior art schemes, in various embodiments of the disclosure, the data buffer instance does not carry an allocator identifier, instead the identity of the allocator responsible for its creation is determined with the aid of the allocator table, table 102, to minimize the instance overhead. As earlier noted, in the face of millions of instances, the realized overhead space savings can be significant. Additionally, the size of the allocator table is minimized by indexing the table based on page address and not a data buffer instance address. That is, a page in memory 104 may include more than one data buffer instance yet only a single row of the allocator table is affected. An allocator identifier may be a reference, a value, a pointer, or other suitable types of an allocator-identifying entity.

Allocator A 108 may delete a region in memory 104 by deallocating the region from memory 104 and cleaning up all the associated entries—allocator identifiers 114—in table 102. To do so, allocator A 108 determines the page indexes of table 102 corresponding to page addresses of all the pages in the region to be deleted. Allocator A 108 then accesses each entry in table 102 associated with the pages of the region to be deleted by indexing to each entry using the determined page indexes and deletes the entries.

Figure 2:
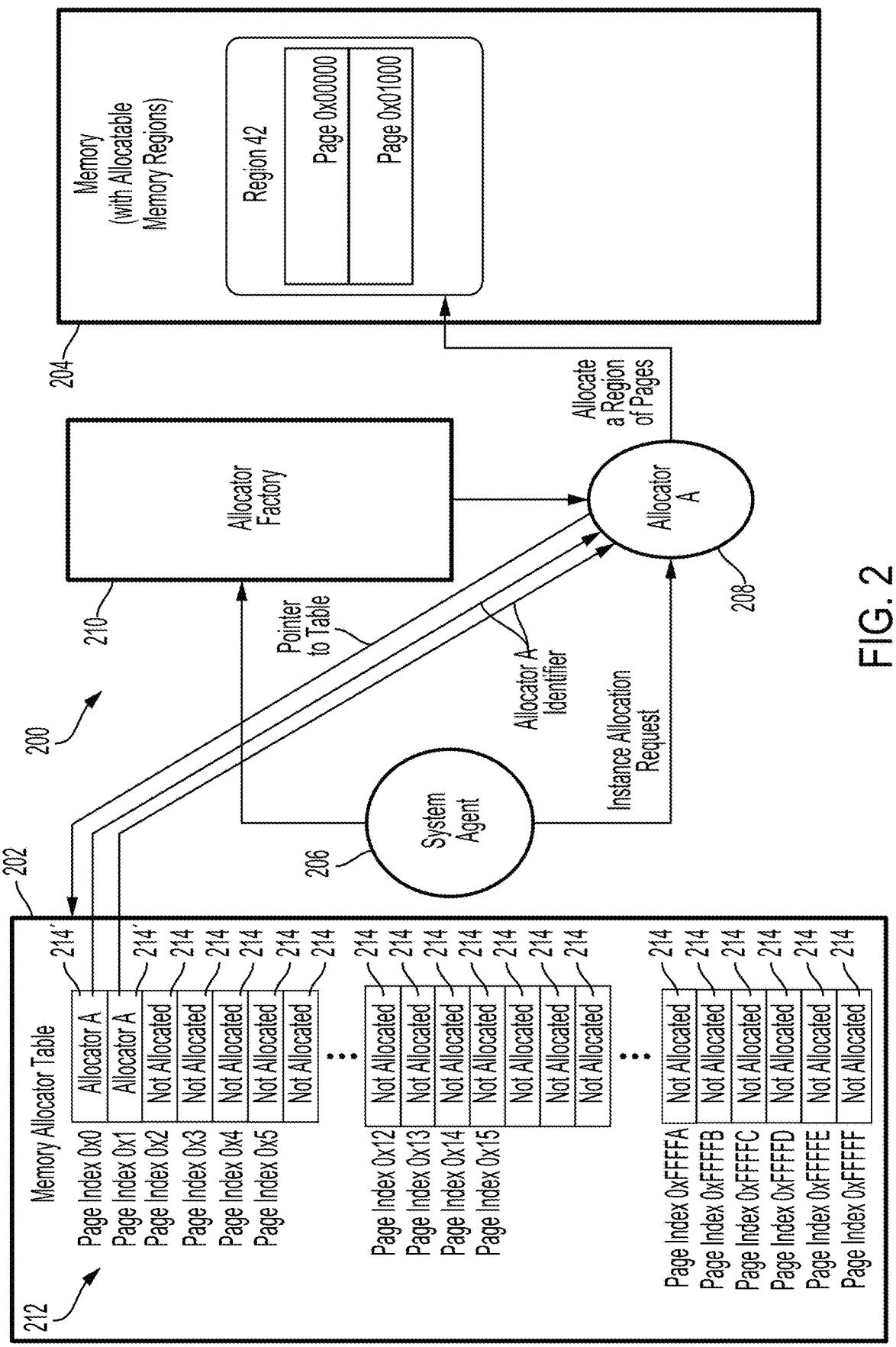
FIG. 2 shows a block diagram of a polymorphic allocator system, in accordance with some embodiments of the disclosure.
Figure 3:
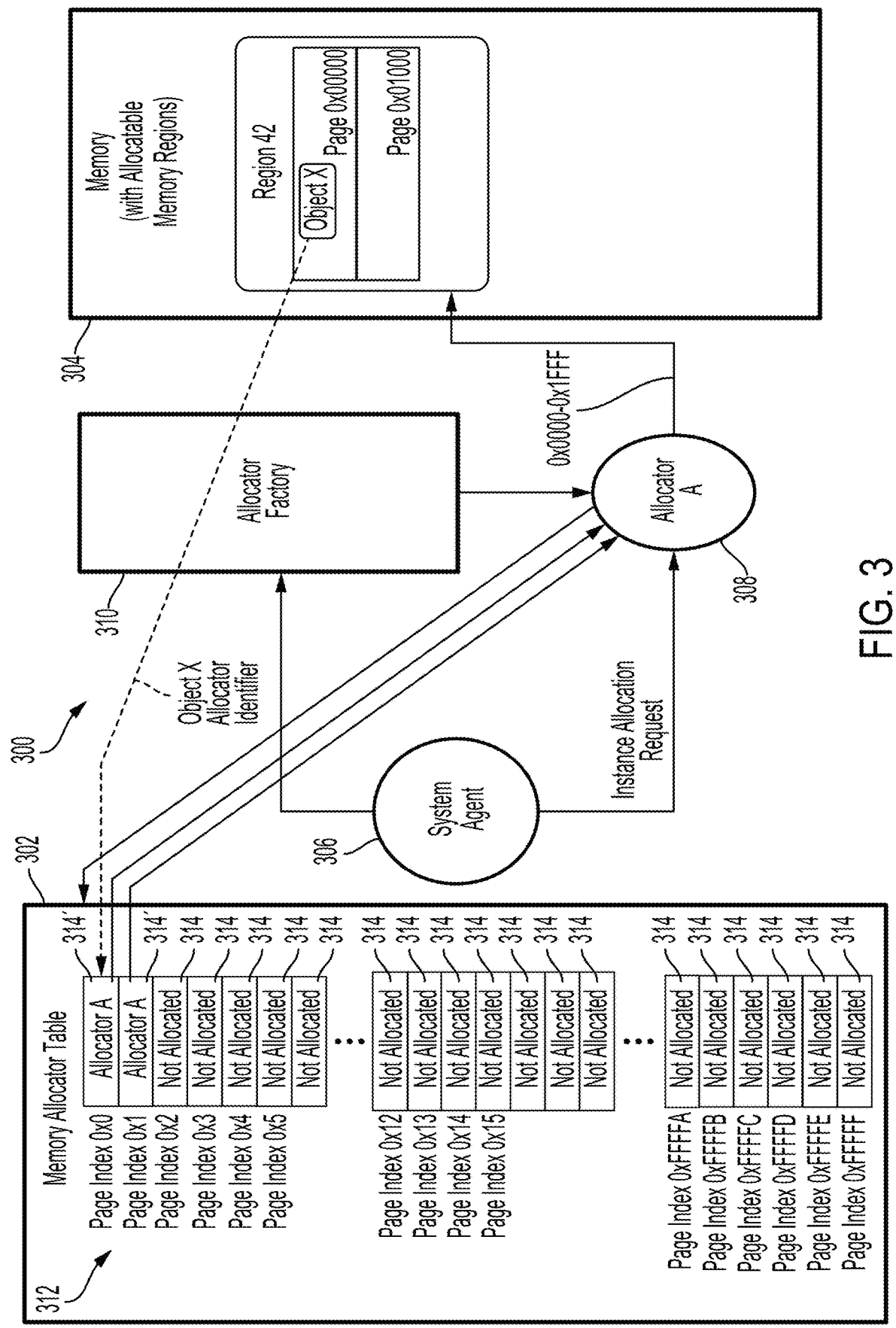
FIG. 3 shows a block diagram of a polymorphic allocator system, in accordance with some embodiments of the disclosure.

Each of FIGS. 2-8 shows a block diagram of a polymorphic allocator system implementing various disclosed memory allocation and deallocation techniques herein. Each of the embodiments of FIGS. 2-8 may be configured analogously to the embodiment of FIG. 1 but the embodiments of FIGS. 2-8 are not limited to the configuration of FIG. 1 and may deviate in design and functionality. Each of the embodiments of FIGS. 2-3 is shown to generally include a polymorphic allocator system with a memory allocator table, memory, a system agent, and an allocator factory and each of the embodiments of FIGS. 4-8 is shown to generally include a polymorphic allocator system with a memory allocator table and memory but no system agent and allocator factory. While not shown, each of the embodiments of FIGS. 4-8 is understood to include structures analogous to those shown in each of the FIGS. 1-3. Additionally, each of the embodiments of FIGS. 2-8 builds on an operational example presented in an immediately preceding figure. For instance, the embodiment of FIG. 2 picks up where the example shown and discussed relative to FIG. 1 leaves off and shows the allocation of certain pages of the region in memory, the embodiment of FIG. 3 picks up where the example shown and discussed relative to FIG. 2 leaves off and shows instantiation of a data buffer in memory in the region of memory shown in FIGS. 1 and 2, and so on.

With reference to FIG. 2, a block diagram of a polymorphic allocator system 200 is shown to include a memory allocator table 202, memory 204, a system agent 206, an allocator factory 210, and an allocator A 208, in accordance with an embodiment of the disclosure. In response to an instance allocation request from system agent 206 to allocator A 208, allocator A 208 causes the creation of region 42 with at least two pages in memory 204. For the mere purpose of illustrating an example, the two shown pages of region 42 are at page addresses 0x00000 and 0x01000 in hexadecimal notation. In response to the creation of region 42, allocator A 208 populates two corresponding table entries of table 202 with its identifier to link the pages of region 42 with itself in the allocator table. Accordingly, the corresponding table entries 214' at page index 0x0 and page index 0x1 of table 202 correspond to the allocated pages of memory 204 and labeled with a prime (') reference number notation (i.e., entries 214') for distinction with other page indexes 212 of table 202, such as page indexes 0x2, 0x3, 0x4, 0x5 Page indexes 0x2, 0x3, 0x4, 0x5 of table 202 correspond to non-allocated page addresses (table 202 entries without a valid allocator identifier) in memory 204. This notation syntax is adopted for the embodiments of FIGS. 3-8. For example, in allocator table 302 of FIG. 3, entries of page indexes 0x0 and 0x1 correspond to allocated memory pages labeled "314"' whereas the entries of table 302 at pages indexes 0x2-0x5 and 0x12-0x15 correspond to unallocated memory pages and are therefore labeled "314", and so on. Allocator A 208 accesses two table entries of table 202 indexed by page indexes 212 corresponding to page addresses of the two pages of region 42 in memory 204. In some embodiments, the correspondence between a page address in memory 204 and a page index 212 in table 202 is that one is a shortened version of the other. For example, a shorter version of the page address of a page in memory 204 may be the corresponding page index 212 in table 202. In an example embodiment, the page address may be shortened by a truncation operation by a certain number of bits to determine the corresponding page index. For example, where a page is 4096 bytes (0x1000 in hexadecimal notation), a page index may be derived by the truncation, or a shift to the right, of the corresponding page address by 12 bits. In the example of FIG. 2, page address 0x00000 in region 42 of memory 204, when shifted to the right by 12 bits, becomes page index 0x00 and page address 0x01000 in region 42 of memory 204 becomes page index 0x01. In some embodiments, the number of truncated bits of the page address may be based on a page size. For example, in FIG. 2, a page size of 4 KB requires shifting the page address to the right (or truncating the page address) by 12 bits. In an example with a larger page size, page addresses of pages in memory 204 may each be truncated by a correspondingly greater number of bits or vice versa. In some embodiments, the number of truncated bits is not necessarily based on a page size and may instead be based on a different characteristic of memory 204 or based on factors not necessarily relating to memory 204. Allocator A 208 writes its allocator identifier (Allocator A) 214 at each of the page indexes 0x0 and 0x1 for identification of allocator A by instances generated by allocator A in memory 204. Allocator A 208 keeps a reference to table 202 for the purpose of subsequently locating the relevant allocator identifier entries at page indexes 0x0 and 0x1 For example, allocator A 208 may maintain a reference to table 202 at a system agent 206 address space. Allocator A 208 may maintain a reference to table 202 at an accessible address space other than the system agent 206 address space. In some embodiments, table 202 may be referenced by allocator A 208 or by an instance in memory 204 at a preidentified location therefore avoiding an internal storage space requirement by the allocator and the instance—an instance and allocator memory space saving measure. In embodiments where allocator A 208 and a saved instance maintain a table 202 reference, the reference may be in the form of a pointer or other suitable types of table 202 identifying entities. In both of the above embodiments, allocator A 208 and an associated instance can access table 202, for example, to perform a region deallocation operation at a subsequent time.

FIG. 3 shows a block diagram of a polymorphic allocator system 300 to include a memory allocator table 302, memory 304, a system agent 306, an allocator factory 310, and an allocator A 308, in accordance with an embodiment of the disclosure. In furtherance of carrying out the instance allocation request discussed above with reference to FIGS. 1-2, in FIG. 3, the data buffer instance, namely object X, is shown instantiated at page 0x00000 of region 42 of memory 304. Allocator A 308 may instantiate object X at a page with available memory space for storing object X. The page is identifiable by a page address, which is within the address range of 0x0000-0x1FFF assigned to the two pages shown in region 42 with base addresses 0x00000 and 0x01000. Object X lacks any knowledge of the identity of the allocator responsible for its creation and instead, when required, must make such a determination. In the example of FIG. 3, allocator A 308 is responsible for the creation of object X and object X determines this allocator identifier by first determining a page index 312 to table 302 corresponding to the address of object X in memory 304 or to the address of the page in which object X resides in memory 304 (the page at page address 0x0000). In an example embodiment, the correspondence between the address of object X in memory 304 and a page index 312 in table 302 is truncation, as earlier discussed with reference to page address and instance address truncation. Assuming object X resides at address 0x0000 of memory 304 and a page size is a 12-bit value, address 0x0000 is truncated by 12 bits to obtain page index 0x0 of table 302. Page index 0x0 points to allocator A, the identity of the allocator responsible for creating object X. In some cases, to determine the correct page index of table 302 corresponding to object X, object X and/or allocator A 308 may truncate the page address (0x00000) of the page in which object X resides by 12 bits. Notably, despite the lack of an instantiated object or data at base page address 0x01000, allocator A 308 maintains its identity at page index 0x1 in table 302. The table entries 314' at page index 0x0 and page index 0x1 of table 302 correspond to allocated pages of memory 304 and are therefore labeled with a prime (') notation (i.e., entries 314') for distinction from page indexes 312 of table 302, such as discussed above relative to FIG. 2.

Assuming object X to be reference-counted, to self-destruct, object X first determines the identity of the allocator responsible for its creation (e.g., allocator A 308) by determining the correct page index 312 in table 302, as discussed above, and reads the table entry (e.g., allocator A 314') corresponding to the correct page index (e.g., 0x0). Next, allocator A 308 may release the memory space occupied by object X in memory 304 and deallocate region 42.

Figure 4:
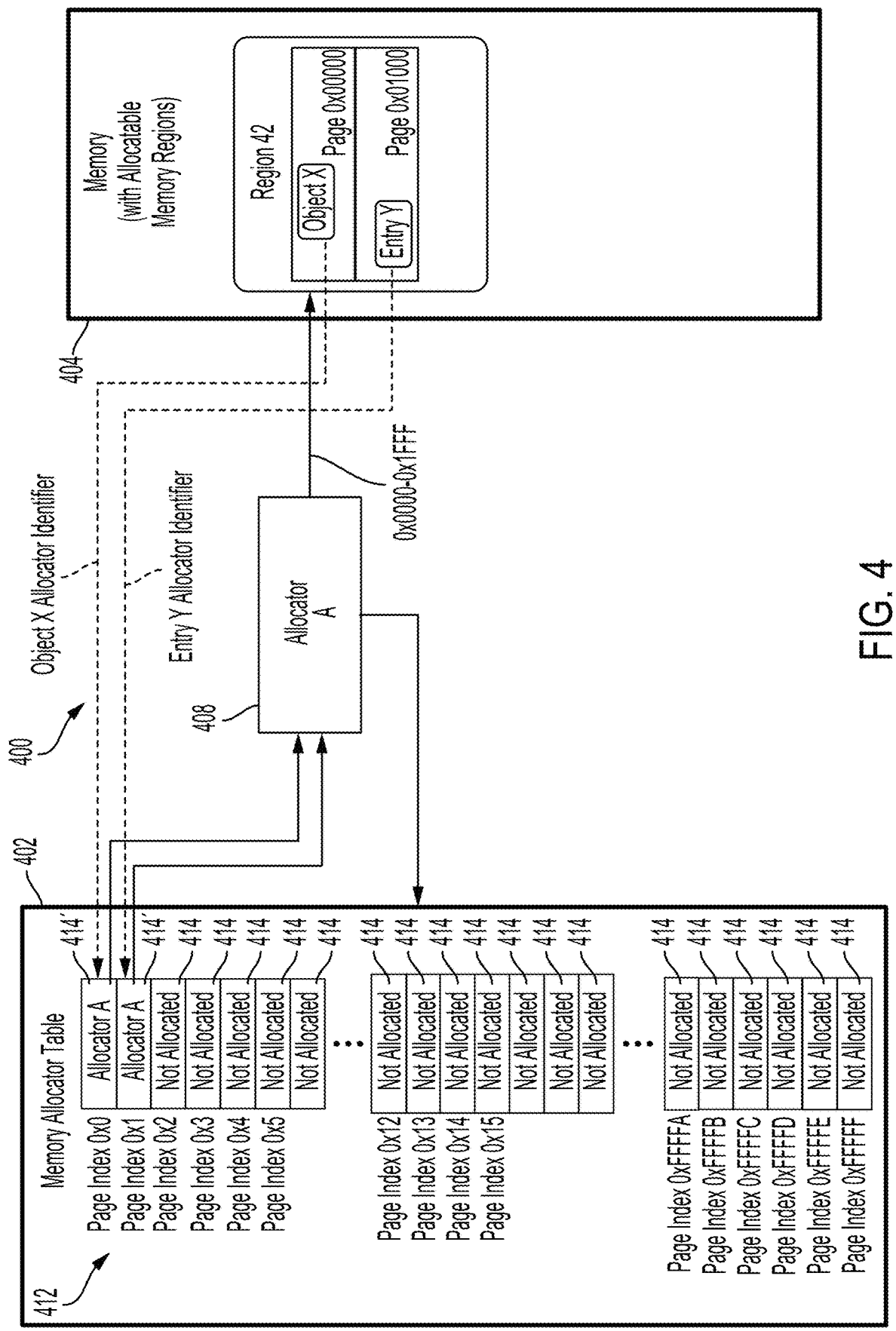
FIG. 4 shows a block diagram of a polymorphic allocator system, in accordance with some embodiments of the disclosure.

FIG. 4 shows a block diagram of a polymorphic allocator system 400 to include a memory allocator table 402, memory 404, and an allocator A 408, in accordance with an embodiment of the disclosure. In the embodiment of FIG. 4, while not shown, the system agent may make another instance allocation request, this time to store the data buffer instance entry Y, which is data (or an entry) and not an object. Responding to the request, allocator A 408 may save entry Y in region 42 of memory 404, for example, at the second page of region 42 identified by base page address 0x01000. Accordingly, to find its corresponding allocator, entry Y may perform a truncation operation on either its address in memory 404 or the page address of the page in which it is housed in memory 404. The outcome of the truncation process yields the correct page index 412 (e.g., page index 0x1), which in turn leads entry Y to identify its allocator, allocator A 408, at the entry or row in table 402 indexed by page index 0x1. Allocator A 408 may instantiate additional objects and/or entries in region 42 of memory 404, as shown and discussed relative to the embodiment of FIG. 5.

Figure 5:
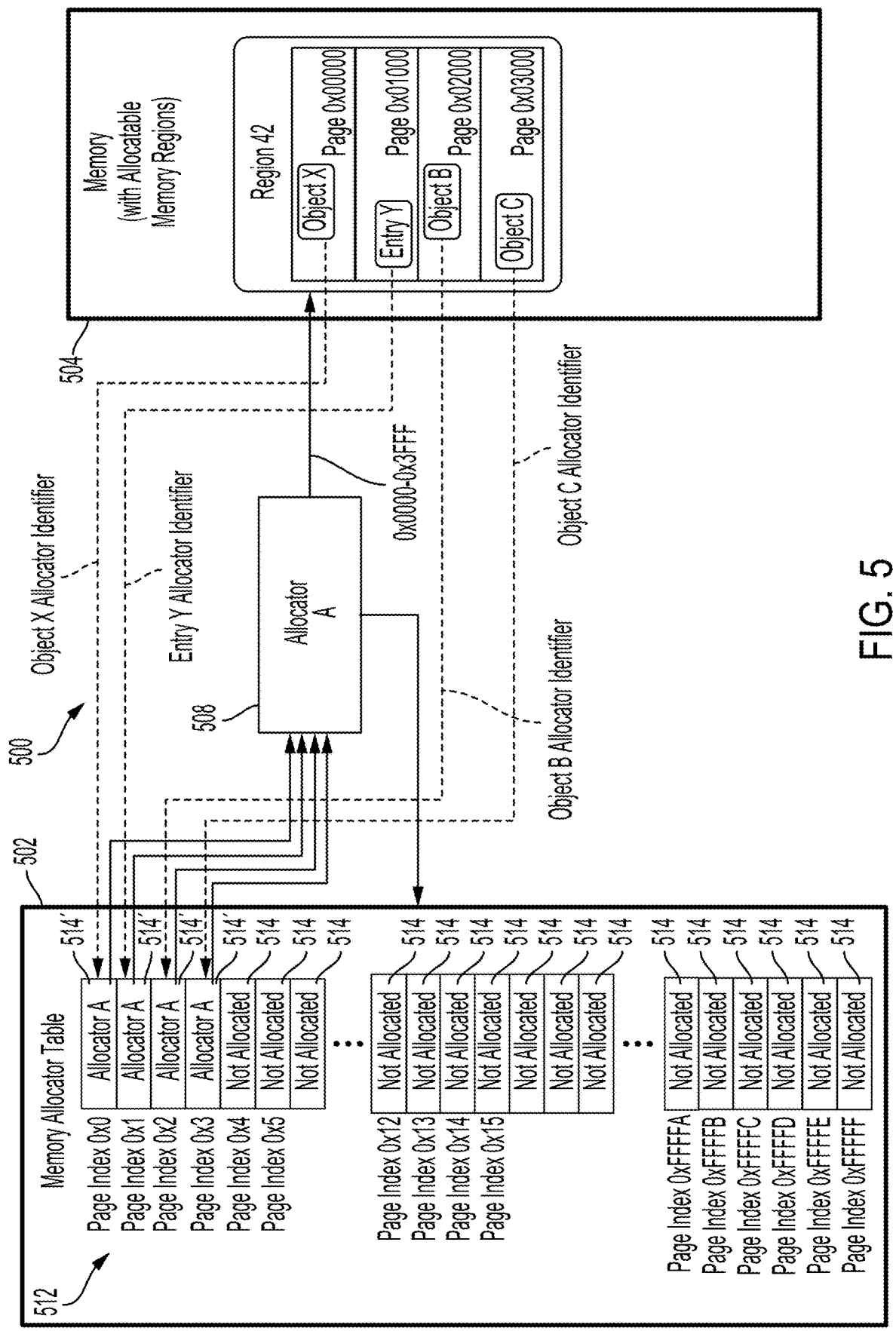
FIG. 5 shows a block diagram of a polymorphic allocator system, in accordance with some embodiments of the disclosure.

FIG. 5 shows a block diagram of a polymorphic allocator system 500 to include a memory allocator table 502, memory 504, and an allocator A 508, in accordance with an embodiment of the disclosure. While not shown in the embodiment of FIG. 5, the system agent (e.g., system agent 106, system agent 206, or system agent 306 of FIGS. 1, 2, and 3, respectively) may make further instance allocation requests for two additional data buffer instances, object B and object C. Responding to the request, allocator A 508 may save object B in region 42 of memory 504, at the third page, the page with a base page address of 0x02000, and further save object C at the fourth page of region 42, the page with a base page address of 0x03000. Next, allocator A 508 populates the corresponding two table entries of table 502 for objects B and C. Using its saved reference to table 502, allocator A 508 determines the page indexes corresponding to the addresses of objects B and C or to the page addresses of the pages in which objects B and C reside by a truncation process similar to the truncation processes described above. For example, the 12 least significant bits of page address 0x02000 of the page housing object B may be dropped by shifting the page address 0x02000 to the right by 12 bits to determine the corresponding page index 512, page index 0x2. Allocator A 508 saves its identity at page index 0x2, the third row of table 502. Similarly, allocator A 508 similarly determines the page index 0x3 for object C and saves its identity, Allocator A, in the row of table 502 at page index 0x3. Accordingly, to determine its corresponding allocator, object B or object C may perform a truncation operation on either their respective addresses in memory 404 or the page addresses of the respective pages in memory 404 housing the objects. Allocator A 508 may perform such a truncation operation when removing object B or object C from memory 504, for example.

Figure 6:
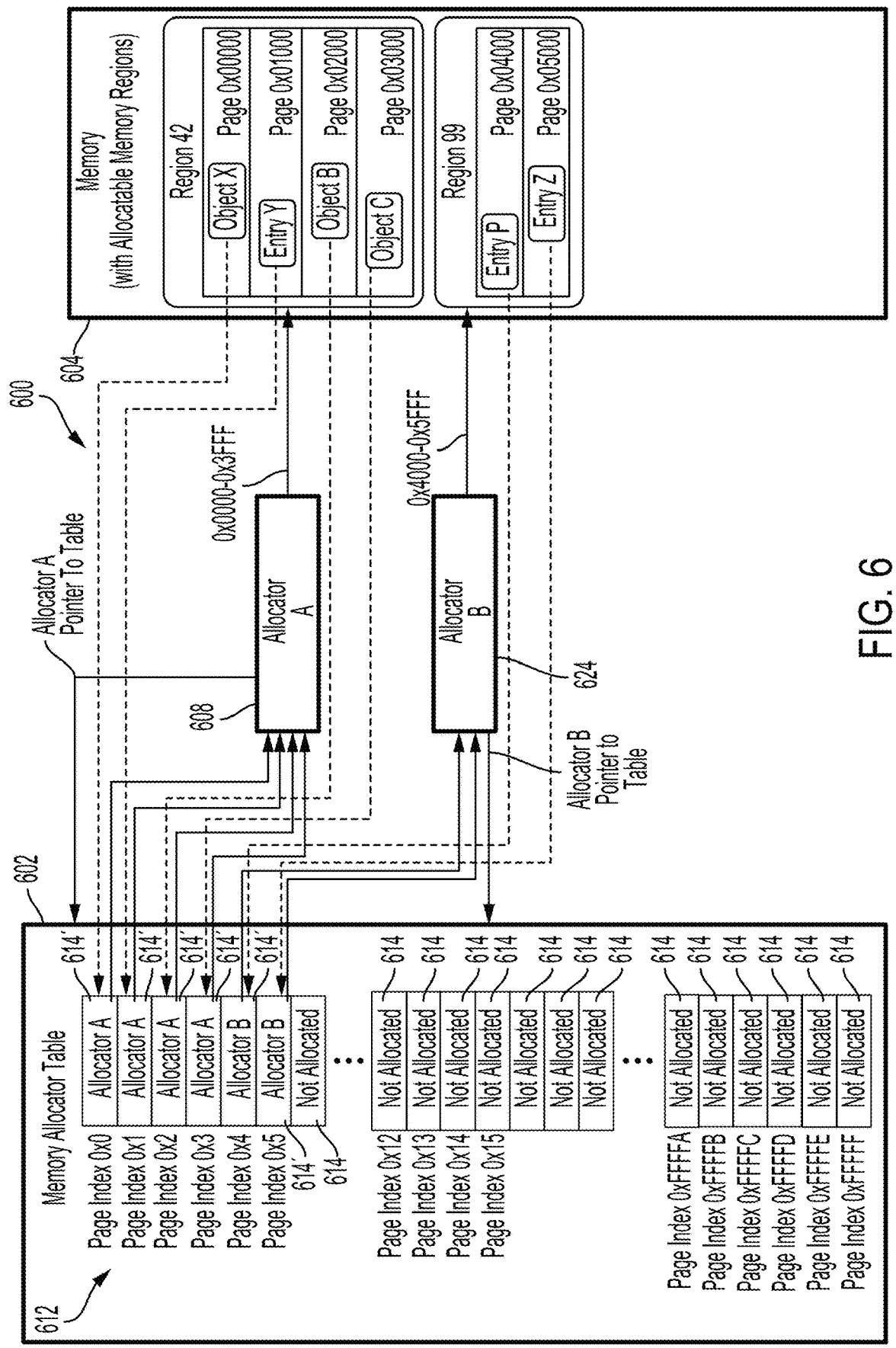
FIG. 6 shows a block diagram of a polymorphic allocator system, in accordance with some embodiments of the disclosure.

FIG. 6 shows a block diagram of a polymorphic allocator system 600 to include a memory allocator table 602, memory 604, an allocator A 608, and an allocator B 624, in accordance with an embodiment of the disclosure. In the embodiment of FIG. 6, a second allocator, namely, allocator B 624 populates and accesses table 602 much in the same manner that allocator A 608 populates and accesses table 602 when allocating pages of a region or storing a data buffer instance in memory 604 but each of the allocators is limited to populating an exclusive portion of table 602 based on the page addresses of memory 604. For example, in FIG. 6, allocator A 608 populates and accesses the table entries at page indexes 0x0, 0x1, 0x2, and 0x3 in table 602 to the exclusion of allocator B 624 and allocator B 624 populates and accesses the table entries at page indexes 0x4 and 0x5 to the exclusion of allocator A 608. Region 42 of memory 604 is created and managed exclusively by allocator A 608 and region 99 of memory 604 is created and managed exclusively by allocator B 624. At a time when pages of either of these regions are deallocated, the pages that previously belonged to the deallocated region may be made available to the allocator that is currently managing the same region. For instance, when region 99 is deallocated by allocator B 624 (and corresponding table entries in table 602 are deleted), allocator A 608 may utilize pages 0x04000 and 0x05000.

In FIG. 6, region 99 is shown to include two pages, a page at page address 0x04000 and another page at page address 0x05000 in memory 604. The page at page address 0x04000 is shown to include a data buffer instance entry P and the page at page address 0x05000 is shown to include a data buffer instance entry Z.

The respective set of page indexes 612 of table 602, managed by allocator A 608 and allocator B 624, is based on a corresponding set of page addresses in memory 604. As described above relative to system 500 of FIG. 5, allocator A-managed page indexes 612, namely page indexes 0x0, 0x1, 0x2, and 0x3, correspond to page addresses 0x00000, 0x01000, 0x02000, and 0x03000, respectively, of region 42 of memory 604. Allocator B 624, on the other hand, has allocated and manages region 99 in memory 604 and region 99 includes the two pages described above relative to and shown in FIG. 6. Accordingly, two corresponding page indexes 612, namely, page indexes 0x4 and 0x5, are populated by allocator B 624 in table 602 to identify allocator B 624 in each respective table entry (or allocator identifier). In some embodiments, the correspondence between a page address of region 99 and a page index 612 of table 602, for example, page indexes 0x4 or 0x5, is a shortened or truncated value. Given the continued assumption that a page size in memory 604 is 4096 bytes, page address 0x04000 may be shifted to the right by 12 bits to determine page index 0x4 in table 602 and page address 0x05000 may be shifted to the right by 12 bits to determine page index 0x5 in table 602. Accordingly, each of data buffer instances entry P and entry Z may perform the foregoing truncation operation to find a corresponding allocator identifier 614, Allocator B, in table 602. Similarly, each of allocators A 608 and B 624 may perform the foregoing truncation operation to determine a corresponding page index 612 in table 602.

The pages of region 42 remain exclusive to allocator A 608 until they are deallocated and made available to other allocators of memory 604. The pages of region 99 remain exclusive to allocator B 624 until they are deallocated and made available to other allocators of memory 604. When deallocating pages of region 42, allocator A 608 deletes the corresponding allocator identifiers 614 of table 602 at page indexes 0x0, 0x1, 0x2, and 0x3 and when deallocating pages of region 99, allocator B 624 deletes the corresponding allocator identifiers 614 of table 602 at page indexes 0x4 and 0x5. Like allocator A 608, allocator B 624 may maintain a reference to table 602 for populating and removing corresponding entries. In some embodiments, each of the allocators A and B access table 602 in a lock-free and wait-less fashion. Allocators A and B may access their page indexes 612 in table 602 simultaneously or at different times. For example, when allocating pages of region 42 in memory 604, allocator A 608 may populate table 602 at page indexes 0x0, 0x1, 0x2, and 0x3 while allocator B 624 may populate table 602 at page indexes 0x4 and 0x5 when allocating pages of region 99 in memory 604. Similarly, the instances of region 42 may access table 602 to locate the identity of their respective allocators while the instances of region 99 may access table 602 to locate the identity of their respective allocators.

Figure 7:
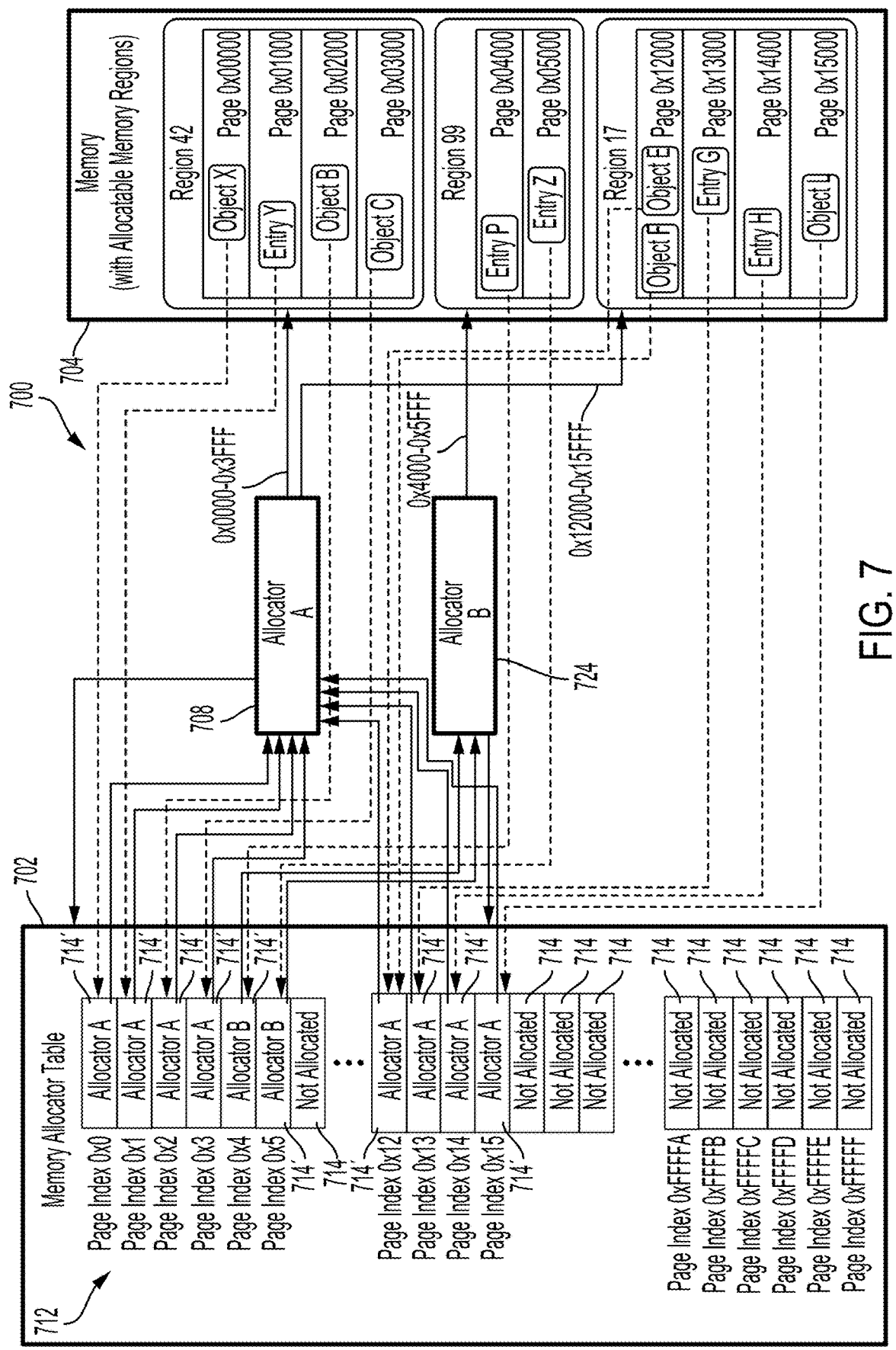
FIG. 7 shows a block diagram of a polymorphic allocator system, in accordance with some embodiments of the disclosure.

FIG. 7 shows a block diagram of a polymorphic allocator system 700 to include a memory allocator table 702, memory 704, an allocator A 708, and an allocator B 724, in accordance with an embodiment of the disclosure. In the embodiment of FIG. 7, after allocation of the pages in region 42, allocator A 708 allocates the pages of another region, namely region 17 of memory 704. Allocator A 708 may allocate the pages of region 17 of memory 704 at the same time, before, or after allocator B 724 allocates the pages of region 99 of memory 704. In the example embodiment of FIG. 7, four pages at region 17 are allocated, the pages at page addresses 0x12000, 0x13000, 0x14000, and 0x15000. Allocator A 708 may allocate these pages, for example, in response to a request from a corresponding system agent to allocate one or more of the data buffer instance objects E, F, and L, and entries G and H. If need be, allocator A 708 may make a determination to allocate pages of a new region (region 17) in memory 704 in response to the request or allocator A 708 may allocate the instances at pages of an already existing region 17 based on the amount of available memory space at the time of the instance allocation. Further based on memory space availability, allocator A 708 may allocate a different number of instances to each page of region 17. For example, and as shown in FIG. 7, allocator A 708 may allocate two instances, objects E and F, to page 0x12000 (e.g., object E may be at address 0x12000 in memory 704 and object F may be at address 0x12345 in memory 704), one instance, entry G, to page 0x13000, one instance, entry H, to page 0x14000, and one instance, object L, to page 0x15000. Notably, the table entry for both objects E and F is common in table 702. That is, the allocator of both objects, allocator A, is found at the same row or page index, page index 0x12, of table 702.

As a part of the allocation process of the pages of region 17 or shortly following, allocator A 708 determines a page index for each of the page addresses of region 17 based on a correspondence thereof. As earlier noted, the correspondence between each page address and a page index may be a truncation operation where a predefined number of the least significant bits of a page address are dropped to determine the page index. For example, page address 0x12000 is shifted to the right by 12 bits to determine page index 0x12, page address 0x13000 is shifted to the right by 12 bits to determine page index 0x13, page address 0x14000 is shifted to the right by 12 bits to determine page index 0x14, and page address 0x15000 is shifted to the right by 12 bits to determine page index 0x15, of table 702. Allocator A 708 writes its identity, Allocator A, at each of the table entries 714 indexed by page indexes 712 (0x12, 0x13, 0x14, and 0x15) but need not save a reference to table 702 because the reference is previously saved during allocation of the pages of region 42 in memory 704.

Figure 8:
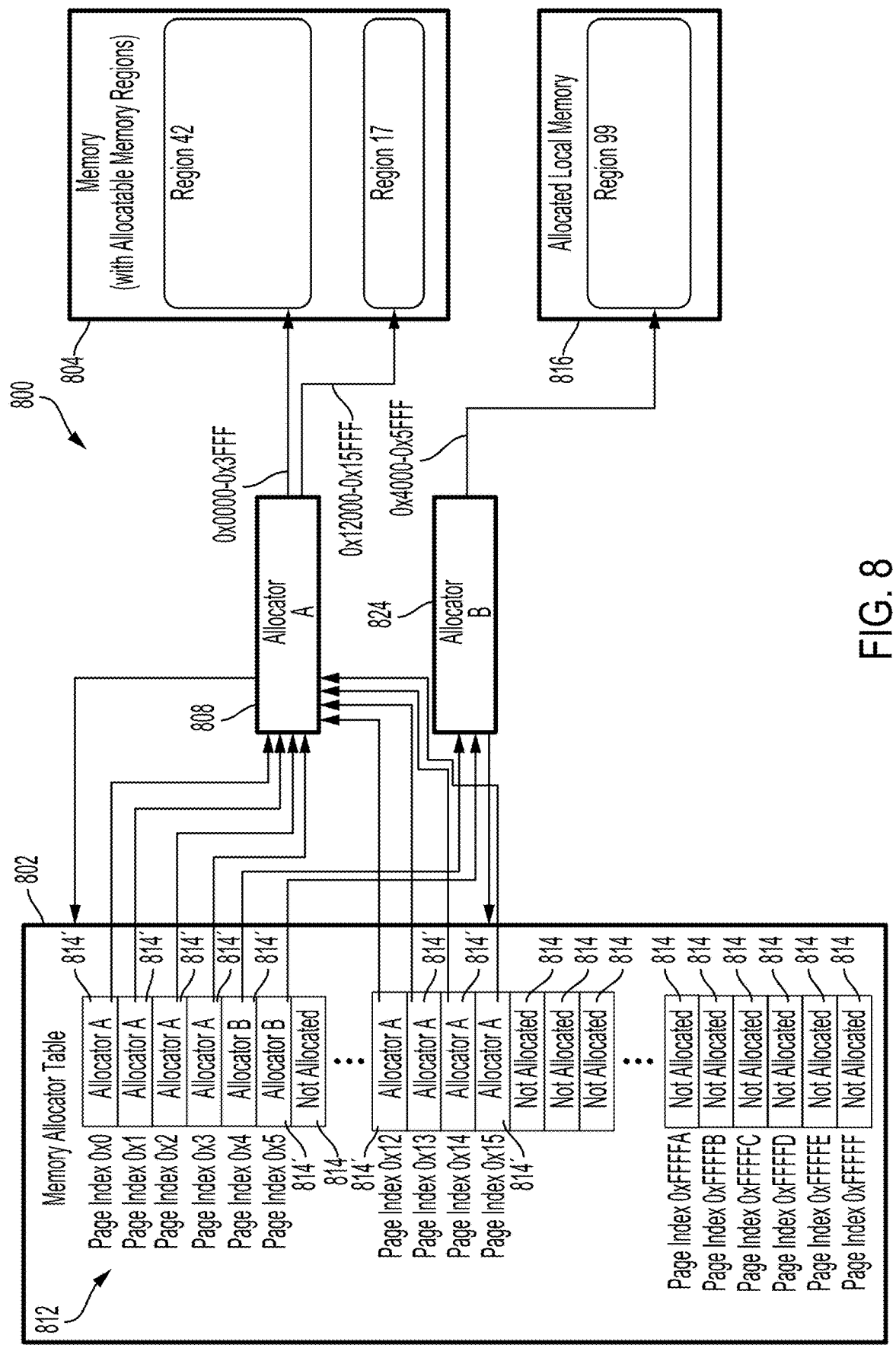
FIG. 8 shows a block diagram of a polymorphic allocator system, in accordance with some embodiments of the disclosure.

FIG. 8 shows a block diagram of a polymorphic allocator system 800 to include a memory allocator table 802, memory 804, memory 816, an allocator A 808, and an allocator B 824, in accordance with an embodiment of the disclosure. The embodiment of FIG. 8 is configured analogously as the embodiment of FIG. 6 except that region 99 is created and managed, by allocator B 824, in a different type of memory than the type of memory housing regions 42 and 17, which are created and managed by allocator A 808. For the clarity of illustration, two different types of memories, namely memory 804 and memory 816, are shown in FIG. 8, whereas, a different number of types of memories may be employed in various embodiments of the disclosure. Additionally, allocator A 808 and allocator B 824 may manage a different number of regions in different types of memory than shown in FIG. 8. In the example embodiment of FIG. 8, memory 804 is of a shared memory type and memory 816 is of a local memory type System 800 may be configured with multiple different types of memories to better tailor each memory to a different type of application for improved system performance.

Figure 9:
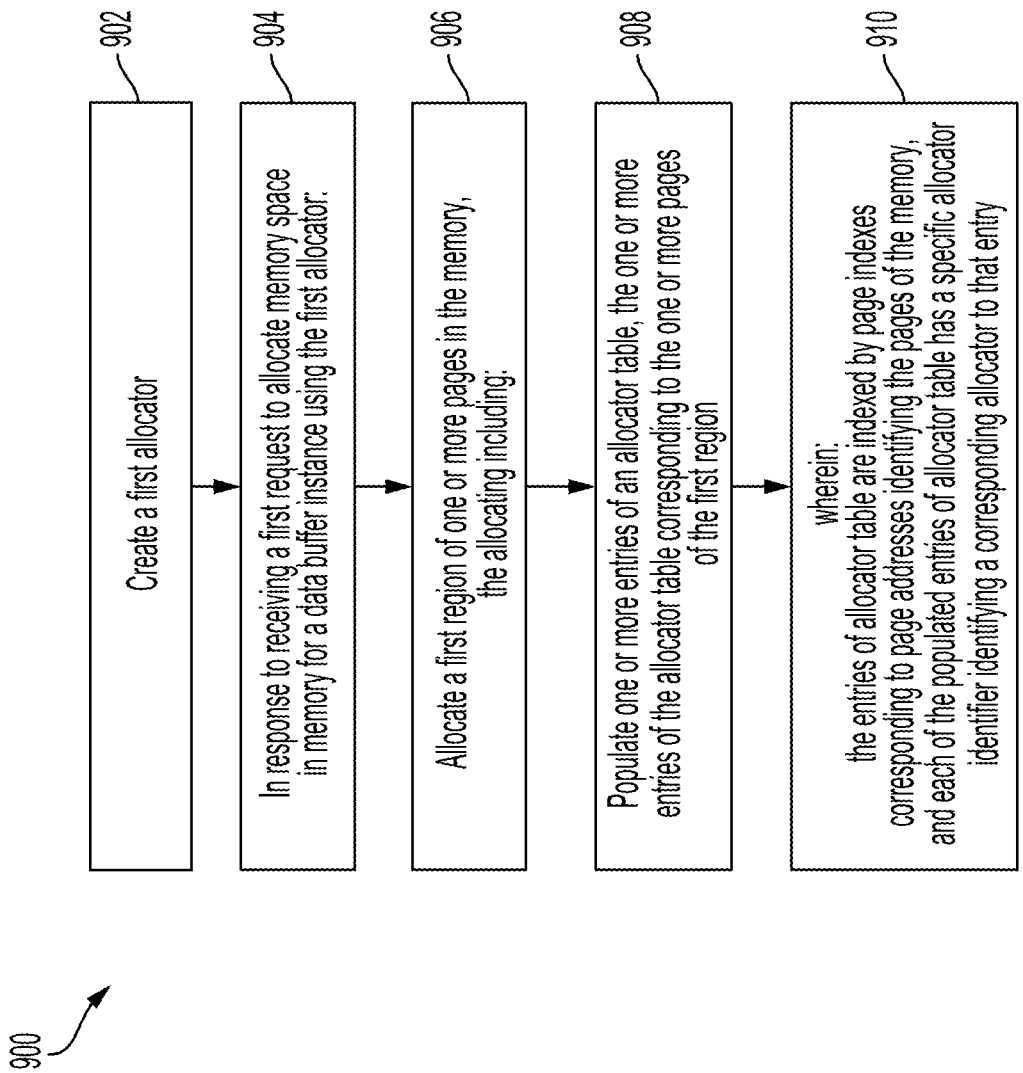
FIG. 9 shows a flow chart of a polymorphic allocator management process, in accordance with some embodiments of the disclosure.

FIG. 9 shows a flow chart of a polymorphic allocator management process, in accordance with some embodiments of the disclosure. In FIG. 9, a polymorphic allocator management process 900 is shown to include various steps that when performed by a polymorphic allocator system, such as without limitation, systems 100, 200, 300, 400, 500, 600, 700, and 800 of FIGS. 1-8, respectively, cause allocation and instantiation of a memory allocator that in turn allocates one or more pages of a region of memory for instantiating a data buffer instance. It is understood that while process 900 is described relative to the various polymorphic allocator system embodiments disclosed herein, process 900 is not limited to these embodiments and may be performed by other polymorphic allocator system embodiments not disclosed herein. For clarity of illustration, process 900 is now described relative to the embodiments of FIGS. 3 and 12.

Figure 12:
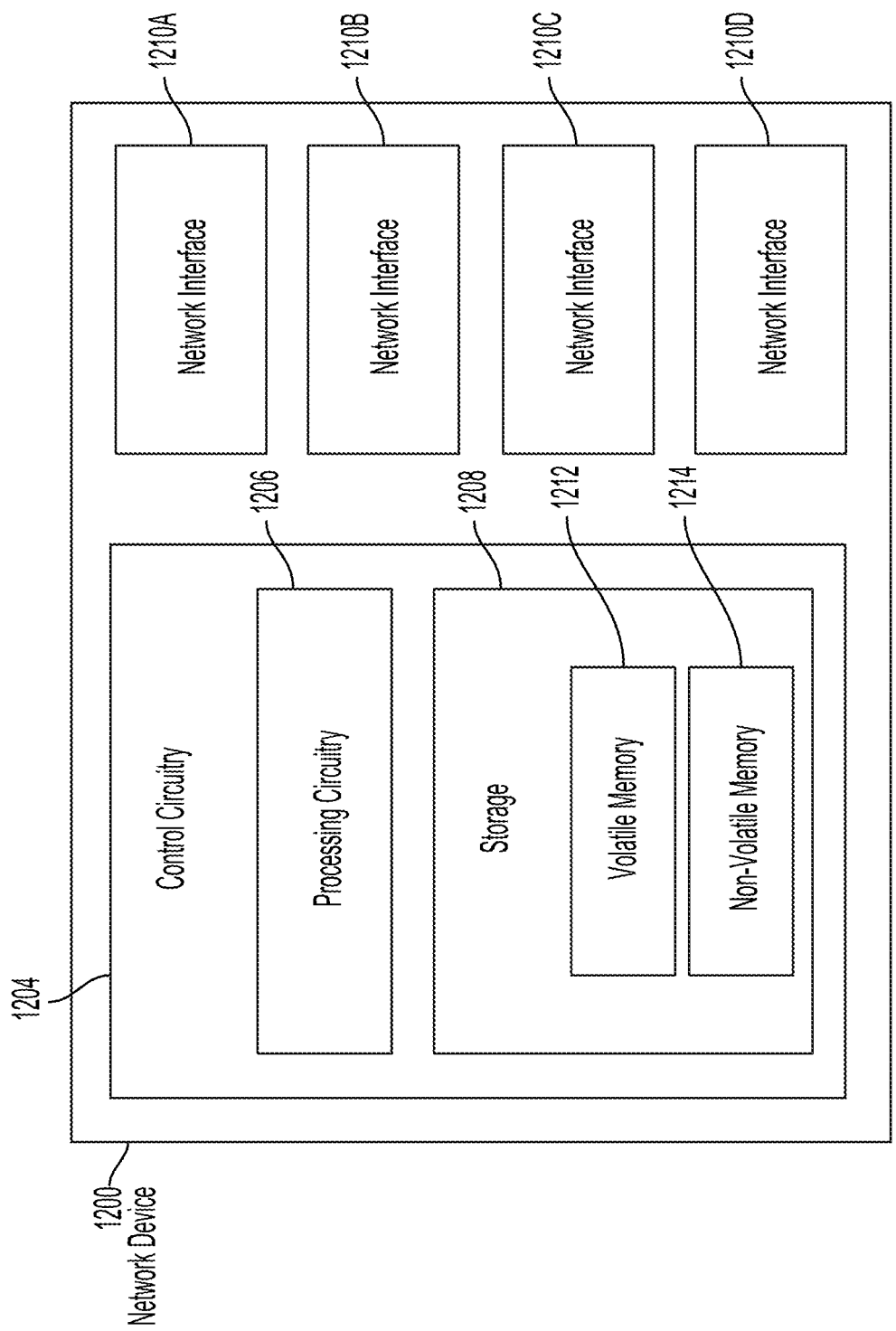
FIG. 12 shows a computing system implementation, in accordance with some embodiments of the disclosure.

In process 900, at step 902, system agent 306 requests the creation of a first allocator and in response, allocator factory 310 creates the first allocator, namely memory allocator A 308. In some embodiments, a control circuitry, such as control circuitry 1204 of a network device 1200 of FIG. 12, may implement parts or all the functions of system agent 306 and allocator factory 310 and may therefore perform step 902 of process 900. Control circuitry 1204 may perform step 902 and the remaining steps of process 900 by executing program instructions stored in storage 1208 of network device 1200 (FIG. 12).

At steps 904 and 906 of process 900, in response to receiving a first request to allocate memory space in memory 304 for instantiating data buffer instance object X, the first allocator (e.g., allocator A 308) allocates one or more pages of a first region, such as region 42 in memory 304. Specifically, in the example embodiment of FIG. 3, allocator A 308 allocates 2 pages of region 42. In some embodiments, control circuitry 1204 of network device 1200 of FIG. 12 may implement parts or all the functions of allocator A 308 and therefore performs step 904 of process 900. Control circuitry 1204 may perform steps 904 and 906 by executing program instructions stored in storage 1208 of network device 1200 (FIG. 12). In some embodiments, allocator A 308 may be implemented by a control circuitry different than the control circuitry implementing system agent 306 and allocator factory 310. For the sake of discussion, system agent 306, allocator factory 310, and allocator A 308 are presumed implemented by a common control circuitry, namely control circuitry 1204, herein.

At step 908, control circuitry 1204, in implementing allocator A 308, populates one or more entries 314' of table 302 corresponding to the one or more allocated pages of the first region (region 42 of memory 304). More specifically, each of the 2 pages at page addresses 0x00000 and 0x01000 of region 42 has a corresponding entry in table 302, found at a page index 312, which is populated with an allocator identifier by allocator A 308. At 910 in FIG. 9, control circuitry 1204 determines each page index by truncating the 12 least significant bits of a corresponding page address of memory 304, as previously discussed relative to preceding figures.

Figure 10:
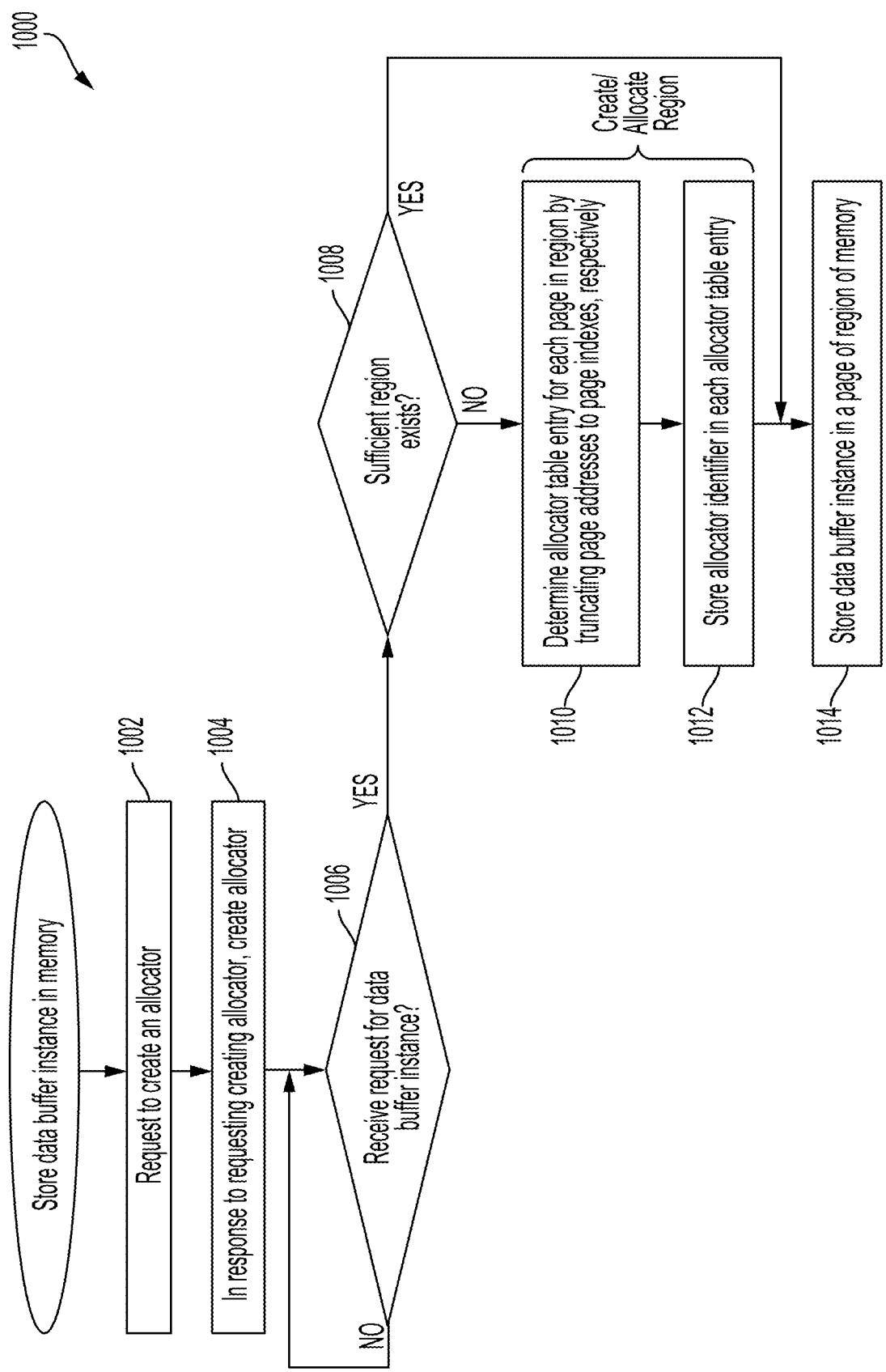
FIG. 10 shows a flow chart of a polymorphic allocator management process, in accordance with some embodiments of the disclosure.

FIG. 10 shows a flow chart of a polymorphic allocator management process, in accordance with some embodiments of the disclosure. In FIG. 10, a polymorphic allocator management process 1000 is shown to include various steps that when performed by a polymorphic allocator system, such as without limitation, systems 100, 200, 300, 400, 500, 600, 700, and 800 of FIGS. 1-8, respectively, for instantiation of a data buffer instance in memory. It is understood that while process 1000 is described relative to the various polymorphic allocator system embodiments disclosed herein, process 1000 may apply to other polymorphic allocator system embodiments not necessarily disclosed herein. For clarity of illustration, process 1000 is now described relative to the embodiments of FIGS. 3 and 12.

In process 1000, at step 1002, system agent 306 requests allocator factory 310 to create an allocator and in response, at step 1004, allocator factory 310 creates an allocator, namely memory allocator A 308. In some embodiments, a control circuitry, such as control circuitry 1204 of a network device 1200 of FIG. 12, may implement parts or all the functions of system agent 306 and allocator factory 310 and may therefore perform steps 1002 and 1004 of process 1000. Control circuitry 1204 may perform steps 1002, 1004 by executing program instructions stored in storage 1208 of network device 1200 (FIG. 12), analogous to the description above relative to FIG. 9. In some embodiments, system agent 306 and allocator factory 310 may be implemented by different control circuitries. In some embodiments, steps 1006-1014 are performed by the allocator created at step 1004, namely allocator A 308. In some embodiments, control circuitry 1204 may implement parts or all the functions of allocator A 308 and may therefore perform steps 1006-1014 of process 1000. Control circuitry 1204 may perform these steps by executing program instructions stored in storage 1208 of network device 1200 (FIG. 12). In some embodiments, allocator A 308 may be implemented by a control circuitry different from the control circuitry implementing system agent 306 and allocator factory 310. For the sake of discussion, system agent 306 and allocator A 308 are presumed implemented by a common control circuitry, namely control circuitry 1204, herein.

At step 1006 of process 1000, in implementing system agent 306, control circuitry 1204 waits to receive a request for instantiating a data buffer instance, such as object X. In response to receiving a request to instantiate object X, at step 1006, process 1000 proceeds to step 1008. At step 1008, control circuitry 1204 determines whether a sufficient region in memory 304 exists for housing object X. Control circuitry 1204 may make such a determination based on the size of object X and the availability of space at an existing region. At step 1008, in response to determining a region with sufficient space to house object X already exists in memory 304, control circuitry 1204 proceeds to step 1014 and in response to determining a region with sufficient space to house object X does not exist in memory 304, control circuitry 1204 proceeds to step 1010 of process 1000.

At steps 1010, 1012, control circuitry 1204 creates and allocates one or more pages of a region (e.g., region 42) in memory 304. At step 1010, control circuitry 1204 determines an entry 314' in table 302 for each page in the allocated region of memory 304 by truncating page addresses to determine page indexes, respectively. For example, control circuitry 1204 looks up entry 314' at page index 0x0 of table 302 by truncating page address 0x00000 of the first page of the two pages of region 42 and looks up the entry at page index 0x1 of table 302 by truncating page address 0x01000 of the second page of the two pages of region 42. At step 1012, the allocator identifier of allocator A 308 (Allocator A) is stored at each of the two entries of table 302 and at step 1014, the data buffer instance is stored in one of the pages of region 42 of memory 304, in the example of FIG. 3, at page 0x00000.

Figure 11:
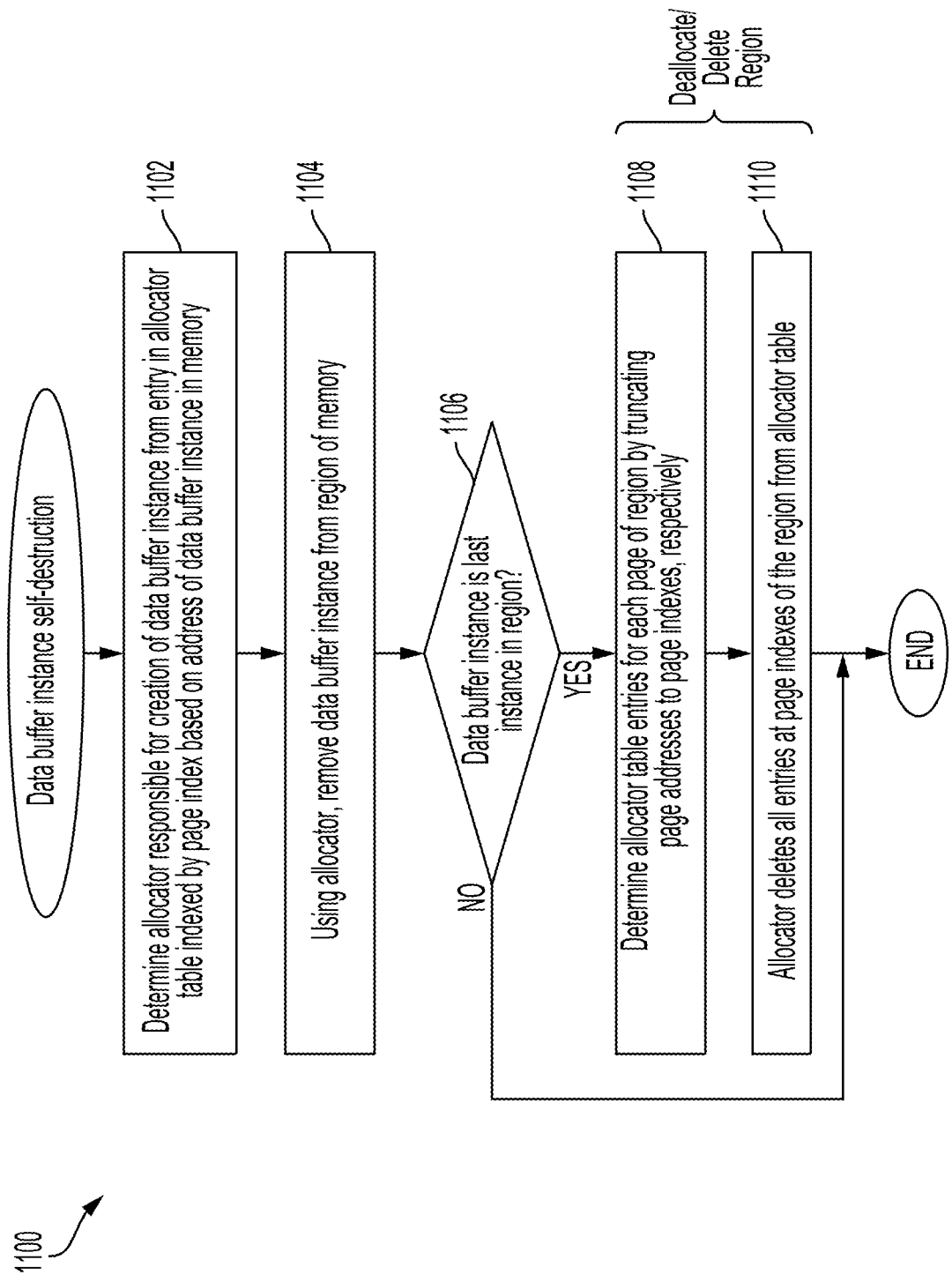
FIG. 11 shows a polymorphic allocator management process, in accordance with some embodiments of the disclosure.

FIG. 11 shows a flow chart of a polymorphic allocator management process, in accordance with some embodiments of the disclosure. In FIG. 11, a polymorphic allocator management process 1100 is shown to include various steps that when performed by a polymorphic allocator system, such as without limitation, systems 100, 200, 300, 400, 500, 600, 700, and 800 of FIGS. 1-8, respectively, for a data buffer instance self-destruction in memory. It is understood that while process 1100 is described relative to the various polymorphic allocator system embodiments disclosed herein, process 1100 may apply to other polymorphic allocator system embodiments not necessarily disclosed herein. For clarity of illustration, process 1100 is now described relative to the embodiments of FIGS. 3 and 12. The data buffer instance, object X, of region 42 of memory 304 is presumed to perform the following steps of process 1100 and in particular, control circuitry 1204 is presumed to execute program instructions stored in storage 1208 (FIG. 12) for implementing the following steps of process 1100.

In process 1100, at step 1102, object X determines the allocator responsible for its creation because object X does not hold information regarding the identity of the allocator responsible for creating it. Object X determines its allocator from an entry 314' in table 302 indexed by a page index 312 that is based on the address of object X in memory 304. For example, object X may determine the correct table entry to access by determining a correspondence between a page index to the correct table entry and the address of object X in memory 304. In some embodiments, the correspondence is a truncation of the address of object X by a number of bits, such as the above example of 12 least significant bits. Object X reads the table entry at the determined page index 312 of table 302 to find the correct allocator identifier of the allocator responsible for its creating, which in the embodiment of FIG. 3 is allocator A.

Allocator A 308 performs the remaining steps starting from step 1104 in process 1100. For the purpose of discussion, control circuitry 1204 is presumed to implement allocator A 308 and perform steps 1104-1110 of process 1100 although it is understood that a different control circuitry than the control circuitry implementing object X may be employed for carrying out steps 1104-1110. For example, step 1102 may be performed by a control circuitry or processor other than control circuitry 1204 and residing in, coupled to, or associated with object X. Step 1102 may be performed by an object X control circuitry executing one or more program instructions stored in, coupled to, or associated with a storage device of object X, other than storage 1208. With reference to the remaining steps of process 1100, storage 1208 is presumed to hold the program instructions executed by control circuitry 1204 to carry out the steps.

At step 1104, in implementing allocator A 308, control circuitry 1204 removes object X from region 42 of memory 304 and at step 1106, control circuitry 1204 determines whether object X is the last instance in region 42. In determining object X to be the last instance in region 42 (as shown to be the case in the embodiment of FIG. 3), control circuitry 1204 executes step 1108 and in determining object X is not the last instance in region 42 (as shown to be the case in the embodiment of FIG. 4), control circuitry 1204 ends process 1100.

At step 1108, control circuitry 1204, in implementing allocator A 308, determines the table entries 314' for each page of region 42 by truncating the respective page addresses of pages of region 42, which in the embodiment of FIG. 3 is shown to be one page. Truncation of a page address of region 42 leads control circuitry 1204 to a corresponding page index 312 of table 302 indexing a table entry 314' which should be the allocator identifier to allocator A 308. At step 1110, control circuitry 1204 deletes all the table entries 314' determined at page indexes 312 of region 42 at step 1108 from table 302 and ends process 1100. In this manner, control circuitry 1204 cleans up the portion of the allocator table (table 302) associated with region 42 and releases the pages of region 42 in memory 304 back to bulk memory for availability to other allocators or for future allocation by allocator A 308. In some embodiments, allocator A 308 may not deallocate a region even if the region is empty (devoid of instances). For example, allocator A may not deallocate an empty region to avoid paying a performance cost typically associated with deallocating regions. In some embodiments, deallocation may therefore be delayed pending receipt of further allocation requests.

In some embodiments, allocator A 308 may deallocate a region even if the region includes instances. For example, for the purpose of optimization, a client application may not call for deletion of all the objects allocated by allocator A on an object instance basis—one object at a time—because allocator A might have a million objects in a thousand different regions and to delete all objects on an object basis would be time consuming. The client application therefore desires to remove all the million objects at once. In this scenario, the client application may wish to destroy or delete allocator A because deletion of allocator A necessarily results in removal of all instances in memory 304 that are created by allocator A—a mass destruction scenario. In some embodiments, deletion of allocator A by a client application causes all regions created by the allocator to be deleted in one operation. For example, system agent 306 may implement deletion of allocator A, which causes removal of all instances of region 42. As earlier discussed, the reason for allocating an allocator may be driven by a client application, for example, to meet a need to use or make use of a particular feature.

FIG. 12 shows a generalized embodiment of a network device 1200. In some embodiments, network device 1200 may be configured as a router, a switch, and/or any other network device, such as without limitation, systems 100, 200, 300, 400, 500, 600, 700, and 800 of FIGS. 1, 2, 3, 4, 5, 6, 7, and 8, respectively, for allocation of memory spaces of a shared or local memory, or a combination thereof, in response to requests from system agents, such as without limitation system agents 106, 206, and 306 of FIGS. 1, 2, and 3, to house (data or object) instances by polymorphic memory allocators, such as without limitations, allocators A and B of FIGS. 1-8. Data buffer instances in the form of object instances may be hierarchically organized and data buffer instances in the form of entry instances may have a flat organizational structure in the shared or local memories, such as the memory 804 and memory 816 of FIG. 8, respectively. In example embodiments, object instances logically represent respective system states of a networking environment.

Network device 1200 may receive, via a network interface (e.g., network interface 1210A), a request to store a data buffer instance (e.g., Objects B, C, E, F, L, and X and Entries G, H, P, Y, and Z of FIGS. 1-8) in memory, such as storage 1208. Network device 1200 performs storage of the instances with control circuitry 1204, which includes processing circuitry 1206 and storage 1208. In some embodiments, storage 1208 may be configured as a shared memory, for example, memory 104, 204, 304, 404, 504, 604, 704, and 804 of FIGS. 1, 2, 3, 4, 5, 6, 7, and 8, respectively, and/or local memory 816 of FIG. 8. In some embodiments, execution of a user program code, stored in storage 1208, by processing circuitry 1206, implements a system agent (e.g., system agent 106, 206, 306 of FIGS. 1, 2, 3, respectively) of the shared memory or the local memory.

While network device 1200 is shown to include four network interfaces (e.g., network interfaces 1210A, 1210B, 1210C, and 1210D), in FIG. 12, this is merely illustrative, and those skilled in the art will appreciate that network device 1200 may include any number of network interfaces, and that the network interfaces may be of any type of wired or wireless network interface, such as RJ45 ethernet ports, a coaxial ports, logical ports, wireless interfaces (e.g., 802.11x interfaces, BLUETOOTH interfaces, cellular interfaces, etc.)

Control circuitry 1204 may be based on any suitable processing circuitry, such as processing circuitry 1206. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). In some embodiments, control circuitry 1204 executes instructions for performing various operations as a system agent (e.g., system agents 106, 206, and 306 of FIGS. 1, 2, and 3, respectively) and an allocator (e.g., allocator A or allocator B of FIGS. 1-8) would perform on bulk memory, as described above with reference to FIGS. 1-8. For example, control circuitry 1204 may perform the polymorphic allocator management process processes or certain polymorphic allocator management process steps of the processes of FIGS. 9-11. In some embodiments, control circuitry 1204 executes instructions for performing various operations as a system agent (e.g., system agents 106, 206, and 306 of FIGS. 1, 2, and 3, respectively) or an allocator factory (e.g., allocator factory 110, 210, and 310 of FIGS. 1-3) would perform, as described above with reference to FIGS. 1-3. For example, control circuitry 1204 may perform the processes or certain steps of the processes performed by an allocator or an object or entry on an allocator table (e.g., tables 102, 202, 302, 402, 502, 602, 702, and 802 of FIGS. 1, 2, 3, 4, 5, 6, 7, and 8, respectively.

Storage 1208 may include volatile random-access memory (RAM) 1212, which does not retain its contents when power is turned off, and non-volatile RAM 1214, which does retain its contents when power is turned off. In some embodiments, storage 1208 may be an electronic storage device that is part of control circuitry 1204. As referred to herein, the phrase "electronic storage device" or "storage device" should be understood to mean any device for storing electronic data, computer software, instructions, and/or firmware, such as random-access memory, content-addressable memory, hard drives, optical drives, solid state devices, quantum storage devices, or any other suitable fixed or removable storage devices, and/or any combination of the same. In some embodiments, one or more allocator tables 102, 202, 302, 402, 502, 602, 702, and 802 of FIGS. 1, 2, 3, 4, 5, 6, 7, and 8, respectively, are stored in storage 1208. In other embodiments, one or more of the allocator tables 102, 202, 302, 402, 502, 602, 702, and 802 may be stored on a separate device and a link to a corresponding allocator table may be stored in storage 1208. In some embodiments, a data buffer instance, such as Objects B, C, E, F, L, and X and Entries G, H, P, Y, and Z of FIGS. 1-8, may be stored in storage 1208. In some embodiments, a data buffer instance such as Objects B, C, E, F, L, and X and Entries G, H, P, Y, and Z of FIGS. 1-8, may be stored on a separate device and a link to the root object may be stored in storage 1208. The circuitry described herein may execute instructions included in software running on one or more general purpose or specialized processors. Multiple circuits may be provided to handle simultaneous processing functions.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method of allocating memory space in a memory comprising:
   creating a first allocator; and
   in response to receiving a first request to allocate memory space in the memory for a data buffer instance, using the first allocator to:
      allocate a first region of one or more pages in the memory, the allocating including:
         populate one or more entries of an allocator table, the one or more entries of the allocator table corresponding to the one or more pages of the first region,
   wherein:
      the one or more entries of the allocator table are indexed by page indexes corresponding to page addresses identifying the one or more pages of the memory, and
      each of the one or more populated entries of the allocator table includes a specific allocator identifier identifying a corresponding allocator to that entry.

2. The method of claim 1, further comprising storing the data buffer instance in the first region of the memory.

3. The method of claim 1, wherein the first request to allocate memory space in the memory for the data buffer instance is in response to a request to the first allocator to allocate the data buffer instance within the memory for storing the data buffer instance.

4. The method of claim 1, wherein pages of a region of the memory are exclusive to a distinct allocator.

5. The method of claim 1, further comprising generating a page index of the allocator table by truncating a page address of a corresponding page in the memory.

6. The method of claim 5, wherein the truncating is based on a page size of the corresponding page in the memory.

7. The method of claim 1, further comprising generating a page index of the allocator table by truncating an address of a corresponding data buffer instance in the memory.

8. The method of claim 1, further comprising determining an allocator identifier for the first allocator that created the data buffer instance for deletion of the data buffer instance by the first allocator from the memory, wherein the allocator identifier of the first allocator is determined from the allocator table based on a truncated address of the data buffer instance in the memory.

9. The method of claim 8, wherein determining an allocator identifier of the first allocator comprises determining a page index of the allocator table corresponding to an address in the memory identifying a location of the data buffer instance, wherein an entry corresponding to the page index indicates the allocator identifier.

10. The method of claim 1, further comprising creating a second allocator, wherein the second allocator is created to allocate a second region in the memory.

11. The method of claim 10, further comprising in response to receiving a second request, the second allocator allocates the second region of the memory, the second region including at least one page, wherein the second allocator allocating the second region includes populating at least one entry of the allocator table with a second allocator identifier corresponding to the second allocator, a page index of the at least one entry of the allocator table corresponding to the at least one page of the second region.

12. The method of claim 10, wherein the first allocator and the second allocator access, populate, or remove corresponding entries of the allocator table simultaneously and in a lock-free fashion.

13. The method of claim 1, wherein in response to a request to remove the first region, the first region is deallocated after all data buffer instances of the first region have been removed.

14. The method of claim 1, further comprising removing entries of the allocator table corresponding to pages of all data buffer instances of the first region and releasing the memory space in the memory allocated to the first region, wherein the released memory space is available to an allocator different from the first allocator.

15. The method of claim 1, wherein in response to a request to remove the first region, the first allocator deallocates the first region while the data buffer instance is maintained in the memory.

16. A device comprising:
   storage for storing program instructions; and
   a control circuitry configured to execute the stored program instructions, wherein execution of the stored program instructions causes a polymorphic allocator system to:
      configure one or more allocators to manage an allocator table, the allocator table comprising:
         entries including allocator identifiers, an allocator identifier identifying a corresponding allocator, the allocator including a reference to the allocator table for accessing the entries of the allocator table, the entries of the allocator table indexed by page indexes generated by truncation of page addresses of corresponding pages in a memory where data buffer instances are stored.

17. The device of claim 16, wherein a data buffer instance is configured to remove itself from the memory by identifying an allocator responsible for creating the data buffer instance from an entry of the allocator table indexed by a page index corresponding to a truncation of an address identifying a location of the data buffer instance in the memory.

18. The device of claim 16, wherein the entries of the allocator table are arranged as a contiguous array of entries.

19. The device of claim 16, wherein the allocator table is a hash table.

20. A method of allocating memory space in a memory comprising:
   in response to a request, storing one or more data buffer instances in the memory using a first allocator by:
   allocating a first region of one or more pages in the memory; and
   populating one or more entries of an allocator table with an allocator identifier identifying the first allocator,
   wherein the first allocator includes a reference to the allocator table for accessing the one or more entries of the allocator table, the one or more populated entries of the allocator table are indexed by corresponding page indexes, and each page index is generated by truncation of a page address of a corresponding page in the memory where at least one of the data buffer instances is stored.

* * * * *